WARDEN & PETTY.
Oil Still.
No. 37,263.
Patented Dec. 23, 1862.
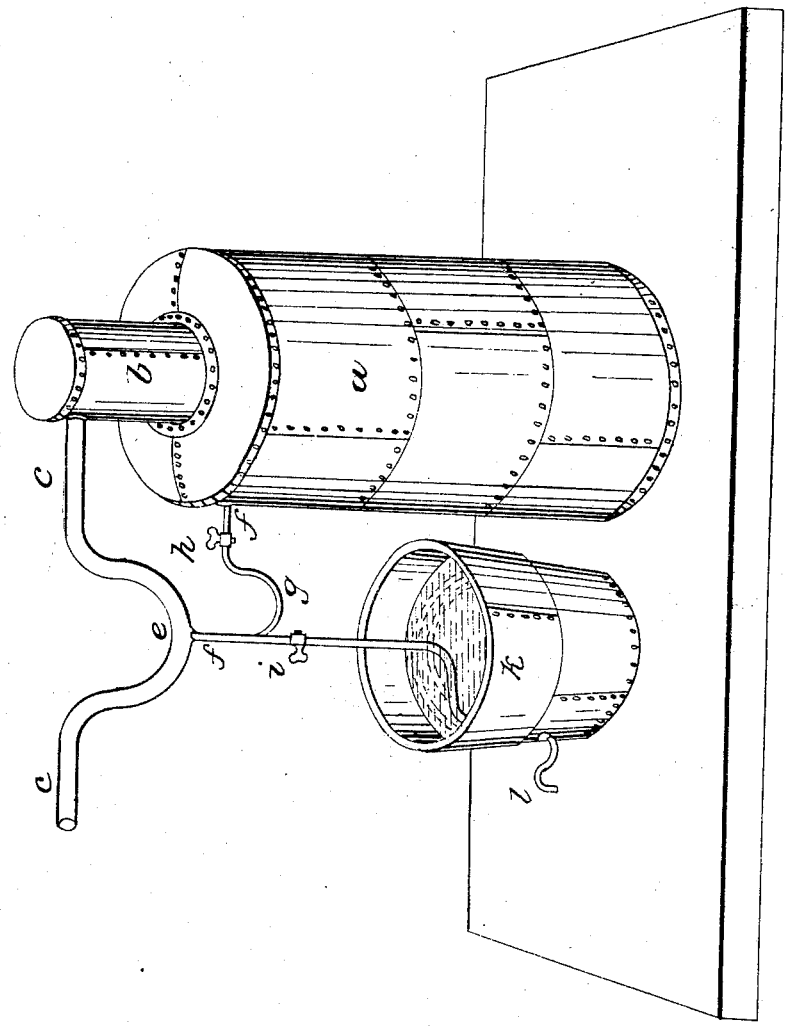

UNITED STATES PATENT OFFICE.

THOMAS K. PETTY AND WILLIAM G. WARDEN, OF PITTSBURG, PA.

IMPROVEMENT IN OIL-STILLS.

Specification forming part of Letters Patent No. 37,263, dated December 23, 1862.

*To all whom it may concern:*

Be it known that we, THOMAS K. PETTY and WILLIAM G. WARDEN, both of Pittsburg, in the county of Allegheny and State of Pennsylvania, have invented a new and useful Improvement in Stills for Distilling Petroleum and other Substances; and we do hereby declare the following to be a full, clear, and exact description thereof, reference being had to the annexed drawing, forming part of this specification, which is a perspective representation of a still constructed with our improvement.

In distilling petroleum or carbon oil the greatest caution is required to prevent any part of the contents of the still from being carried over in a liquid and unvaporized condition into the worm and condenser, and thence into the receptacle for the products of distillation. There is always a tendency, even when the still is not boiling over, to more or less of this mechanical action, the vapor frequently carrying with it small quantities of the raw liquid from the still, and this raw liquid, being highly colored and mingling with the condensed vapor in the condenser, seriously impairs its quality. It frequently happens also, especially when it is desired to urge or hasten the operation of distillation by increasing the heat applied to the still, that the still will begin to flow or boil over before the heat can be reduced, forcing some of the crude and unrefined oil into the goose-neck and pipe leading into the worm of the condenser, thus discoloring and spoiling the entire contents of the condenser.

The object of our invention is to prevent the ill effects of the flowing of the still by arresting and returning to the still or other receptacle all crude and unvaporized oil and other solid or liquid substances which may boil over or be carried with and by the action of the vapor into the pipe leading to the condensing-worm.

In order to enable others skilled in the art to construct and use our improvement, we will proceed to describe it.

Our invention consists in the use, as applied to stills, of a double trap so placed in relation to the still and worm-pipe or goose-neck as to arrest and return to the still or other receptacle any of the liquid and unvaporized matter which may have been carried over with the vapor, or which may have boiled over from the still into the condensing-pipe.

In the drawing, $a$ is a still, the shape of which is immaterial, as our invention is applicable to stills of almost any shape or construction. $b$ is the still-head. From the upper part of the still-head projects nearly horizontally the vapor-pipe $c$; or, if an ordinary goose-neck is used, the pipe $c$ forms a continuation of the goose-neck in a horizontal direction. The horizontal pipe $c$ connects with the worm or other condensing apparatus. Near to the still-head $b$ or to the goose-neck, as the case may be, the pipe $c$ is curved downward, and then immediately curved up again, forming a trap at $e$, the pipe being nearly horizontal or slightly inclining downward toward the still on both sides of the trap $e$. From the lowest point of the trap in the main vapor-pipe a small pipe, $f$, descends far enough to be curved up so as to form a second trap at $g$, and thence extends horizontally into the still at a point below that at which the vapor-pipe $c$ enters the still-head or goose-neck. The small pipe $f$ is open at both ends, communicating at its upper end with the lowest point of the trap in the pipe, and at its lower end opening into the body of the still. The upper trap, $e$, should be placed near to the still at a point between which and the still the process of condensation of the vapor arising from the distillation has not commenced, so that no part of the condensed vapor may mingle with the unvaporized liquid, which it is the purpose of our trap to catch before it has mingled with the condensed products of distillation.

The operation of our double trap is as follows: The vapor arising from the contents of the still in the process of distillation passes out of the goose-neck or still-head through the pipe $c$, carrying with it more or less unvaporized liquid oil or particles of paraffine, pitch, or other heavy matters. These are deposited mechanically by reason of their greater specific gravity (and not by condensation, as it is not our design to return any condensed vapor to the still by means of our apparatus) in the trap $e$, the contents of which immediately run down the perpendicular portion of the smaller pipe $f$, the cock $i$ being closed into the trap $g$, which will soon be filled as high as the level of the point where the pipe $f$ enters the body of the still, and the excess will run back continually into the still. Thus the pipe $f$ serves to keep the upper trap, $e$, clear, and leaves the pipe $c$ unobstructed for the free passage of vapor to the condenser, while the lower trap, $g$, being always full, prevents the passage of up through the pipe $f$. The operation will be the same in case the still begins to flow or boil over, as it is very liable to do if the fires get too hot. The flow will pass through the pipe $c$ into the upper trap, $e$, and thence descend, and be returned to the still through the pipe $f$ and trap $g$. The contents of the trap $e$ may be conducted into a separate receptacle, instead of being returned into the still, by continuing the pipe $f$ downward to connect with a worm in a tub of cold water $k$, the worm terminating in a small goose-neck, $l$, where it leaves the tub $k$, so as to prevent the passage of air up through the pipe $f$. In this case the perpendicular pipe $f$ and worm in the tub $k$ will form the lower trap, which may be used instead of returning the contents of the upper trap, $e$, into the still. This arrangement is combined with that before described, as shown in the drawing, the worm and its cooler or tub $k$ being placed below the trap $g$, and a stop-cock, $i$, being inserted in the pipe $f$ below the trap $g$, and another stop-cock, $h$, between the trap $g$ and the still, so that the apparatus may be used in either way.

By the use of our improvement of the double trap an oil-still may be worked as close to the flowing-point as may be desired, without danger of driving the crude oil, paraffine, pitch, &c., into the condenser, which would materially injure all the distilled oil collected therein. In case the still begins to flow or boil over, and it is found that there is any danger of the pressure in the still forcing the matter collected in the trap $g$ into the vapor-pipe $c$, the connection between the lower trap, $g$, and the still $a$ must immediately be closed by shutting the cock $h$ and opening the cock $i$ in the pipe $f$, so as to allow the contents of the trap $e$, instead of passing back into the still, to run down the pipe $f$, and thence through the worm in the tub $k$, and out at the goose-neck $l$, in which case the pipe $f$ and worm, with its goose-neck $l$, serve as the lower trap, and receive all unvaporized liquid flowing from the still. Care must be taken to have a goose-neck, $l$, so constructed with the worm of the pipe $f$ as to retain some liquid in the worm, and thus prevent the passage of atmospheric air up the pipe $f$ into the vapor-pipe $c$.

What we claim as our invention, and desire to secure by Letters Patent, is—

1. The use in stills for distilling hydrocarbon oils, of a double trap, constructed substantially as hereinbefore described, so connected with the still and its worm-pipe or goose-neck as not to return to the still the heavier vapors or any condensed products of distillation, but so that any unvaporized liquid or solid substances carried over with the vapor, or boiling over from the still, through the still-head or goose-neck shall be arrested before reaching the worm or condenser, and either return to the still or collected in a separate receptacle.

2. Drawing off the unvaporized matter which is carried over from the still in the process of distillation, and thereby preventing it passing into the condenser or receptacle for distilled oil by means of the apparatus, substantially as hereinbefore described.

In testimony whereof we, the said THOMAS K. PETTY and WILLIAM G. WARDEN, have hereunto set our hands.

THOS. K. PETTY.
WM. G. WARDEN.

Witnesses:
A. S. NICHOLSON,
W. BAKEWELL.